(12) United States Patent
Chang

(10) Patent No.: US 8,573,878 B2
(45) Date of Patent: Nov. 5, 2013

(54) QUICK-RELEASE DEVICE

(76) Inventor: Chin-Chao Chang, Taichung (TW)

( * ) Notice: Subject to any disclaimer, the term of this patent is extended or adjusted under 35 U.S.C. 154(b) by 369 days.

(21) Appl. No.: 13/160,508

(22) Filed: Jun. 15, 2011

(65) Prior Publication Data

US 2012/0321370 A1 Dec. 20, 2012

(51) Int. Cl.
    *B25G 3/18* (2006.01)
(52) U.S. Cl.
    USPC ..................... 403/322.4; 301/124.2
(58) Field of Classification Search
    USPC ........ 403/322.1, 322.4, 374.1, 374.5, DIG. 4; 301/124.2; 280/279, 288.4
    See application file for complete search history.

(56) References Cited

U.S. PATENT DOCUMENTS

| | | | |
|---|---|---|---|
| 5,823,555 A * | 10/1998 | Ashman ..................... 280/279 |
| 7,090,308 B2 * | 8/2006 | Rose et al. ................ 301/110.5 |
| 7,673,947 B2 * | 3/2010 | Chang ........................ 301/124.2 |
| 8,186,768 B2 * | 5/2012 | Spahr ......................... 301/124.2 |
| 2010/0109425 A1 * | 5/2010 | Montague et al. ......... 301/124.2 |
| 2013/0033096 A1 * | 2/2013 | Howes ....................... 301/124.2 |

* cited by examiner

*Primary Examiner* — Michael P Ferguson
*Assistant Examiner* — Daniel Wiley

(57) ABSTRACT

A quick-release device includes a tubular structure and a flange radially extends from a second end of the tubular structure. A ring is sleeved on the tubular structure and selectively engaged to the flange and a sleeve is co-axially and securely connected to the ring. A shaft is co-axially connected to the tubular structure. A washer is received in the sleeve and abutting the flange of the sleeve, wherein the shaft extends through the washer. A pivot is mounted to a distal end of the second portion of the shaft. A lever is pivotally mounted onto the pivot. The lever includes a handle having a pair of ears formed on one end of the handle, wherein each ear has a pivot hole defined therein for rotatably receiving two opposite ends of the pivot and a raised portion formed thereon for selectively inwardly forcedly push the washer when fastening the quick-release.

5 Claims, 6 Drawing Sheets

QUICK-RELEASE DEVICE

BACKGROUND OF THE INVENTION

1. Field of the Invention

The present invention relates to quick-release device, and more particularly to a quick-release device that includes a lever selectively driving a tubular structure thereof for detaching the quick-release device when being released.

2. Description of Related Art

A conventional quick-release device in accordance with the prior art shown in FIGS. 5 and 6 is adapted to be mounted on a fork (4), wherein the fork (4) includes a tube (41) having a through hole (410) defined in a free end thereof to allow the quick-release device extending through the tube (41).

The conventional quick-release device includes a shaft (5) extends through the through hole (410) in the tube (41). The shaft (5) has an enlarged head (51) formed on one end thereof. A skirt (511) longitudinally extends from the enlarged head (51) to define a concave portion (510) and a slit (512) is defined in the skirt (511). A through hole (52) is centrally defined in the shaft (5) and communicates with the concave portion (510). A funnel-shaped portion (520) is defined in a bottom of the concave portion (510) and a threaded portion (53) is formed in an inner periphery of the through hole (52). A slot (54) is diametrically defined in the enlarged head (511), wherein the slot (54) extends through the skirt (511) and communicates with the through hole (52) till the threaded portion (53).

An axle (7) has a first end (70) extending into the through hole (52) and connected to the shaft (5). The first end (70) of the axle (7) is threaded and screwed into the threaded portion (53) in the through hole (52). A groove (71) is longitudinally and peripherally defined in the axle (7).

A lever (6) has a first end formed with a cam and pivotally connected to a second end of the axle (7). A pivot hole (60) is laterally defined in the first end of the lever (6). A groove (61) is defined in the first end of the lever (6) and communicates with the pivot hole (60) wherein the groove (61) has a width greater than a diameter of the axle (7). A connector (62) is rotatably received in the pivot hole (60). A receiving hole (62) is diametrically defined in the connector (62) for pivotally receiving the second end of the axle (7).

A fastener (8) is slidably sleeved on the axle (7) and received in the enlarged head (51). The fastener (8) includes a plane portion (81), a tapered portion (80) centrally extending from the plane portion (81) and a hollow insertion (82) co-axially extending from the tapered portion (80), wherein the plane portion (81), the tapered portion (80) and the hollow insertion (82) respectively complementally corresponds to an inner periphery of the enlarged head (51). The hollow insertion (82) is slidable relative to the groove (71). A steel ball (83) is partially received in the groove (71) and a ring (84) is surrounded the hollow insertion (82) to prevent the steel ball (83) from detaching from the groove (71) in the axle (7).

With reference to FIG. 5, the fastener (8) is inwardly moved to expand the enlarged head (51) to make the shaft (5) be secured relative to the tube (41). However, the fork (4) usually has two parallel tubes such that the load for the conventional quick-release device to the fork (4) is unbalance. In addition, the lever (6) of the conventional quick-release device can not drive and rotate the shaft (5) to make the conventional quick-release device quickly detached from the fork (4) such that a unique tool is necessary for rotating the shaft (5). It is inconvenient to rotate and detach the conventional quick-release device from the fork (4).

The present invention has arisen to mitigate and/or obviate the disadvantages of the conventional quick-release device.

SUMMARY OF THE INVENTION

The main objective of the present invention is to provide an improved that includes a lever selectively driving a tubular structure thereof for detaching the quick-release device when being released.

To achieve the objective, the quick-release device in accordance with the present invention comprises a tubular structure adapted to extend a first tube of a fork and having a first end adapted to be mounted to a second tube of the fork. A flange radially extends from a second end of the tubular structure. A ring is sleeved on the tubular structure and selectively engaged to the flange and a sleeve is co-axially and securely connected to the ring. A through hole is centrally defined in the sleeve and a flange radially extends from an inner periphery of the through hole in the sleeve to define a hole and divide the through hole in the sleeve into a first section and a second section, wherein the first section corresponds to the ring, a protrusion extending from and edge of the sleeve opposite to the ring. A spring is compressively disposed in the first section of the through hole in the sleeve, wherein the spring has two opposite ends respectively abutting against the second end of the tubular structure and the flange of the sleeve. A shaft is co-axially connected to the second end of the tubular structure. The shaft has a flange radially extending therefrom to divide the shaft into a first portion and a second portion, wherein the first portion is securely connected to the second end of the tubular structure and the second portion extends through the hole in the sleeve. A washer is received in the second section of the through hole in the sleeve and abutting the flange of the sleeve. A through hole is centrally defined in the washer to allow the second portion of the shaft extending through the washer. A pivot is mounted to a distal end of the second portion of the shaft. A lever is pivotally mounted onto the pivot. The lever includes a handle having a pair of ears formed on one end of the handle, wherein each ear has a pivot hole defined therein for rotatably receiving two opposite ends of the pivot and a raised portion formed thereon for selectively inwardly forcedly push the washer when fastening the quick-release. A trough is defined in the handle near the pair of ears, wherein the protrusion is received in the trough when the quick-release device is released such that the lever can drive and make the sleeve being rotated.

Further benefits and advantages of the present invention will become apparent after a careful reading of the detailed description with appropriate reference to the accompanying drawings.

DETAILED DESCRIPTION OF THE INVENTION

Figure 1:
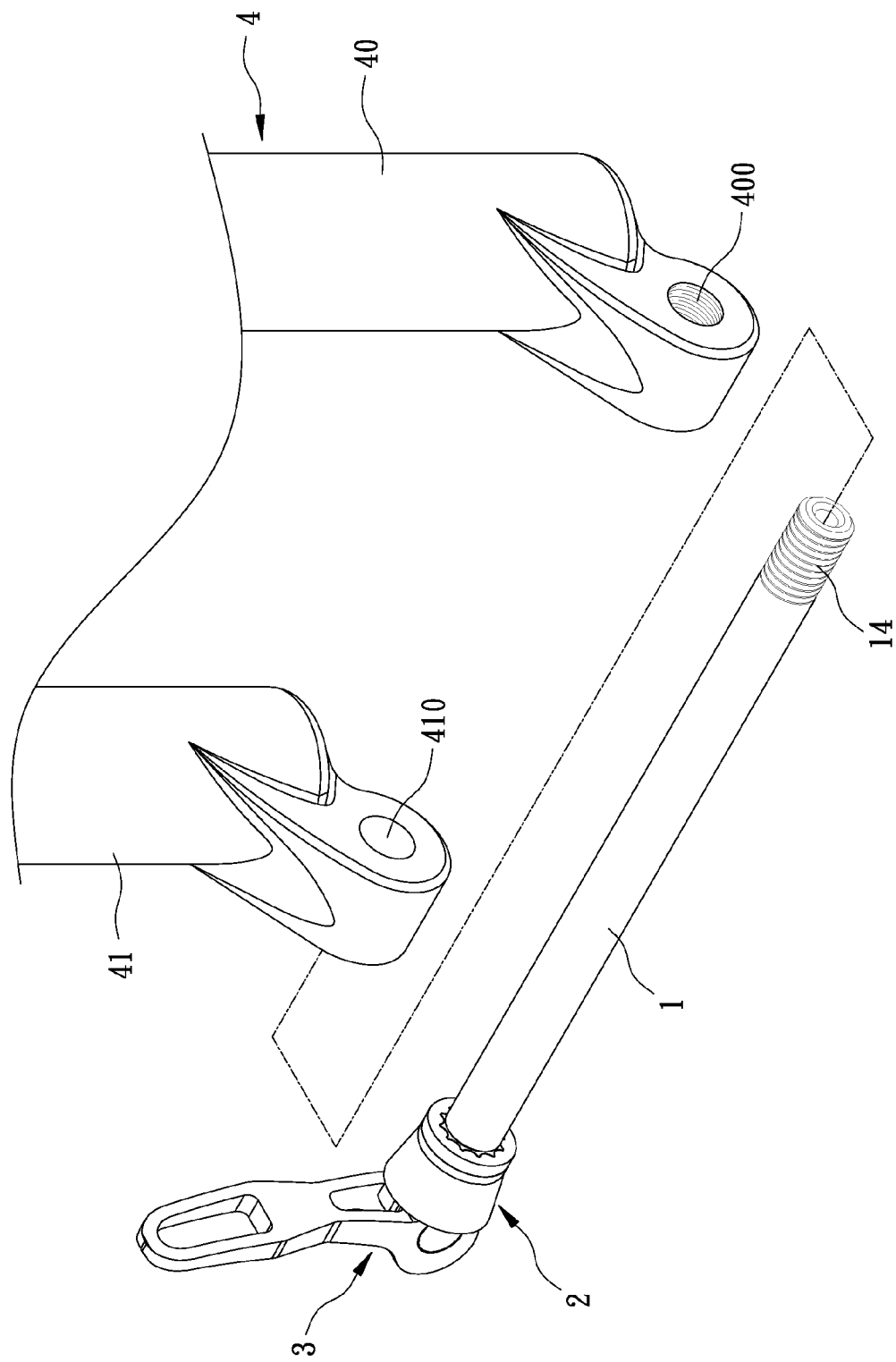
FIG. 1 is a perspective view of a quick-release device in accordance with the present invention.
Figure 2:
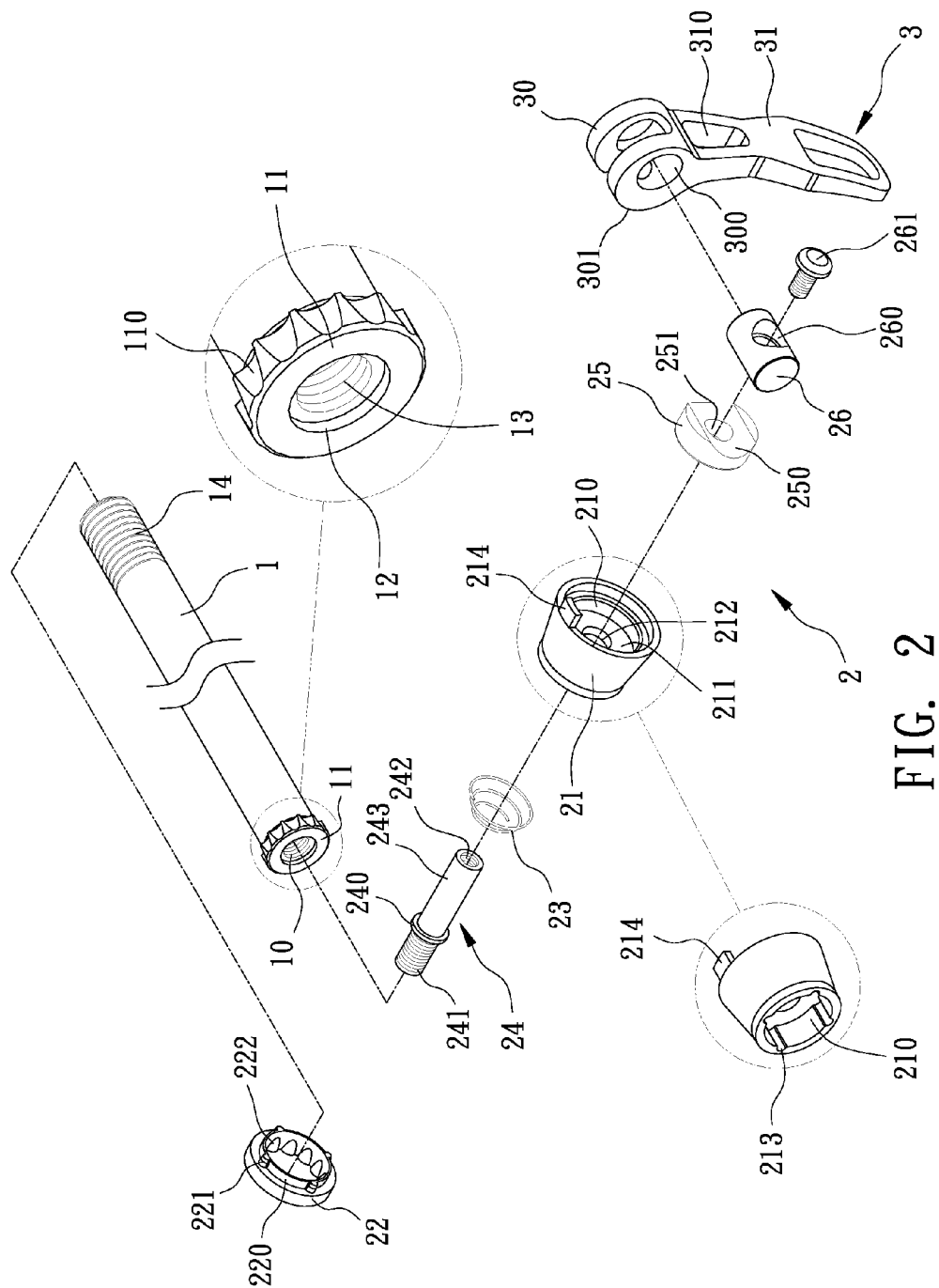
FIG. 2 is an exploded perspective view of the quick-release device in FIG. 1.

Referring to the drawings and initially to FIGS. 1-4, a quick-release device in accordance with the present invention is adapted to be mounted on a fork (4) that has a first tube (40) and a second tube (41) parallel to each other, wherein the first tube (40) has a threaded hole (400) defined in a free end thereof and the second tube (41) has a through hole (410) defined in a free end thereof. The quick-release device in accordance with the present invention comprises a tubular structure (1), an engaging assembly (2) sleeved on the tubular structure (1) and a lever (3) pivotally mounted to the engaging assembly (2).

The tubular structure (1) includes an outer threaded portion (14) formed on a first end thereof and a flange (11) radially extending from a second end thereof, wherein the outer threaded portion (14) is screwed into the threaded hole (400) after the tubular structure (1) extending through the through hole (400) and the flange (11) includes multiple indentations (110) defined therein. A through hole (10) is centrally defined in the tubular structure (1) and an annular groove (12) defined in the longitudinally defined in the second end of the tubular structure (1), wherein the annular groove (12) co-axially communicates with the through hole (10) in the tubular structure (1). An inner threaded portion (13) is formed on an inner periphery of the through hole (10) near the annular groove (12).

The engaging assembly (2) includes a ring (22) sleeved on the second end of the tubular structure (1) and selectively engaged to the flange (11). The ring (22) includes a skirt (220) longitudinally extending from an inner periphery thereof and multiple stubs (221) laterally extending from the skirt (220). The ring (22) includes multiple bosses (222) radially extending from the inner periphery thereof. Each boss (222) is selectively received in a corresponding of the indentations (110) such that the tubular structure (1) is rotated with the ring (22) when the corresponding boss (222) and indentation (110) are engaged to each other. A sleeve (21) is longitudinally mounted onto the ring (22). The sleeve (21) a through hole (210) centrally defined therein. A flange (211) radially extends from an inner periphery of the through hole (120) in the sleeve (21) to centrally define a hole (212) and divided the through hole (210) into a first section and a second section. Multiple ditches (213) are longitudinally defined in an inner periphery of the first section of the through hole (210) in the sleeve (21). Each ditch (213) is provided to securely receive a corresponding one of the stubs (221) such that the ring (22) is rotated with the sleeve (21) when the sleeve (21) is driven by the lever (3). A protrusion (214) longitudinally extends from an edge of the sleeve (21) opposite to the ring (22) and selectively engaged to the lever (3). A spring (23) is compressively disposed between the second end of the tubular structure (1) and the flange (211) of the sleeve (21) for providing a restitution force to the sleeve (21) with the ring (22).

A shaft (24) is co-axially mounted to the second end of the tubular structure (1). The shaft (24) includes a flange (240) radially extending therefrom to divide the shaft (24) into a threaded portion (241) and a smooth portion (243), wherein the flange (240) of the shaft (24) is received in the annular groove (12) in the second end of the tubular structure (1) and the threaded portion (241) of the shaft (24) is screwed into the inner threaded portion (13) of the tubular structure (1). The smooth potion (243) sequentially extends through the spring (23) and the sleeve (21) via the hole (212), and has a threaded hole (242) longitudinally and co-axially defined in a distal end thereof.

A washer (25) is rotatably received in the second section of the through hole (210) in the sleeve (21) and abutting the flange (211) of the sleeve (21). The washer (25) has a curved groove (250) diametrically defined therein and opposite the flange (211) of the sleeve (21) and through hole (251) centrally defined therein to allow the smooth portion (243) extending through the washer (25). A pivot (26) is mounted to the distal end of the smooth portion (243) of the shaft (24). A through hole (260) is diametrically defined in the pivot (26) for partially received smooth portion (243) of the shaft (24), wherein the through hole (260) in the pivot (26) has a T-shaped cross-section. A bolt (261) extends into the through hole (260) in the pivot (26) and is screwed into the threaded hole (242) in the shaft (24) for holding the pivot (26) in place.

The lever (3) is pivotally mounted onto the pivot (26). The lever (3) includes a handle (31) having a pair of ears (30) formed on one end of the handle (31). Each ear (30) has a pivot hole (300) defined therein for rotatably receiving two opposite ends of the pivot (26) and a raised portion (301) formed thereon for selectively received in the curved (251) and inwardly forcedly push the washer (25) when fastening the quick-release device in accordance with the present invention. A trough (310) is defined in the handle (31) near the pair of ears (30). The protrusion (214) is received in the trough (310) when the quick-release device in accordance with the present invention is released such that the lever (3) can drive and make the sleeve (21) being rotated.

Figure 4:
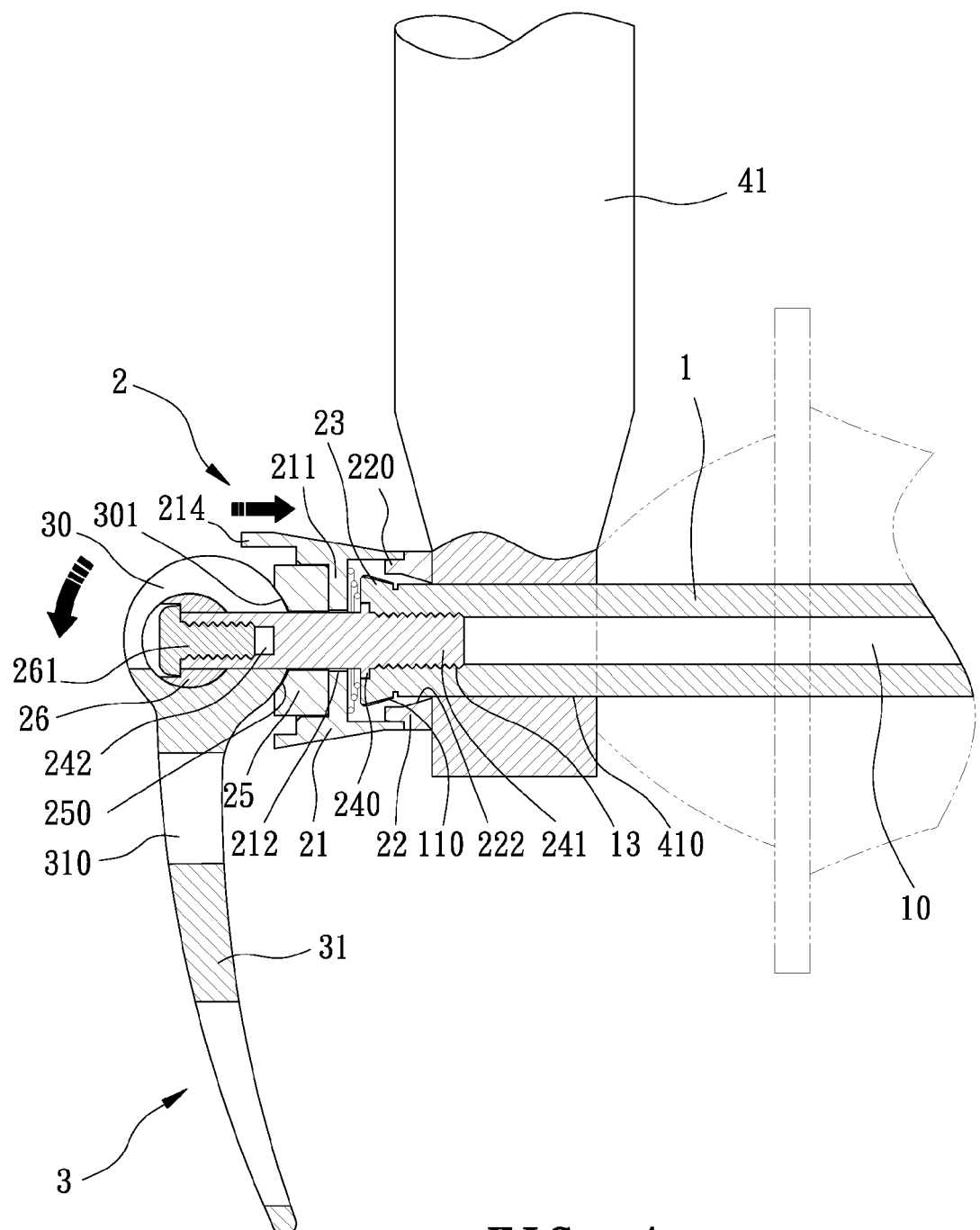
FIG. 4 is a cross-sectional view of the quick-release device in FIG. 1 when being fastened.
Figure 5:
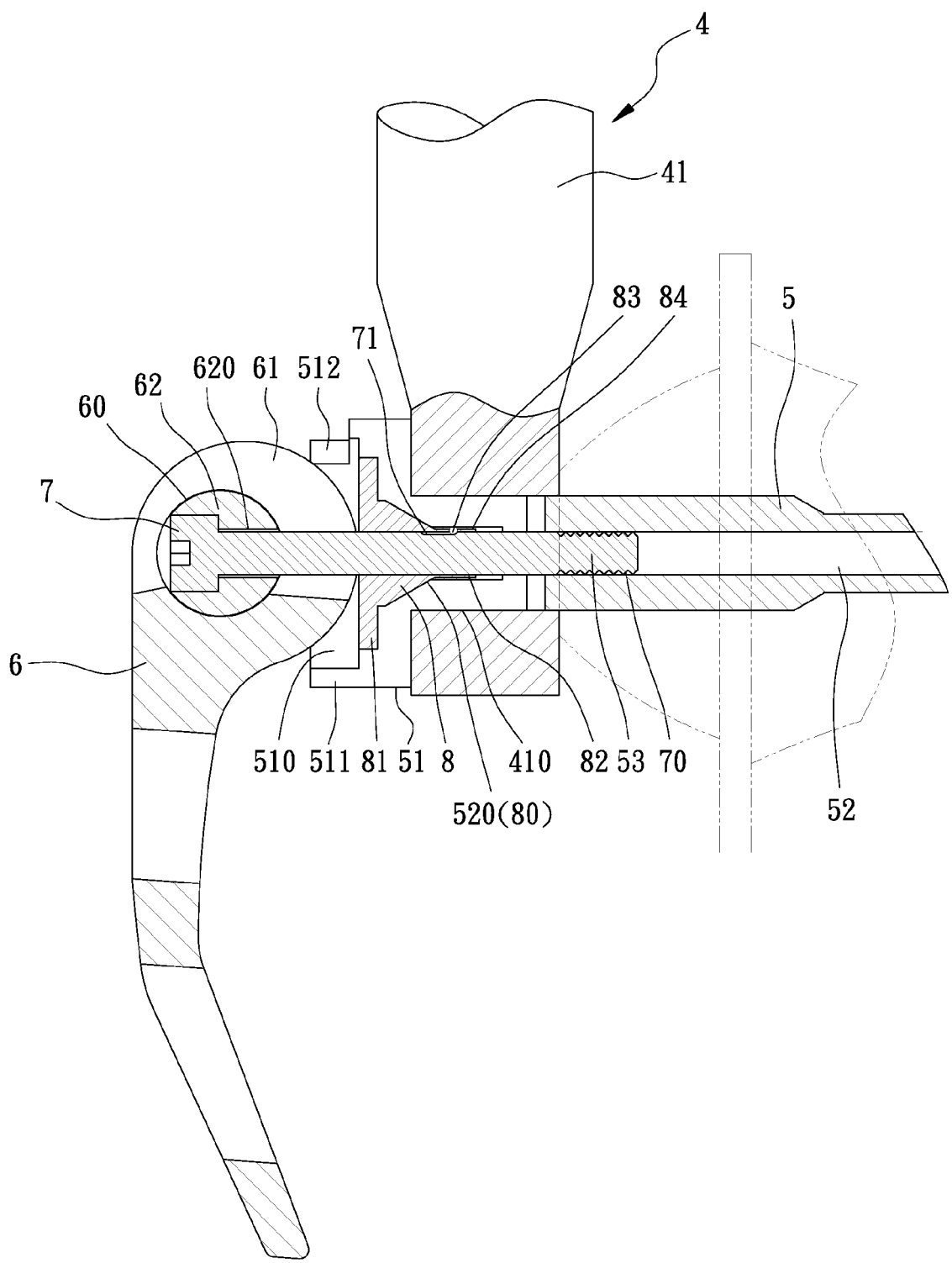
FIG. 5 is a cross-sectional view of a conventional quick-release device in accordance with the prior art when being fastened.
Figure 6:
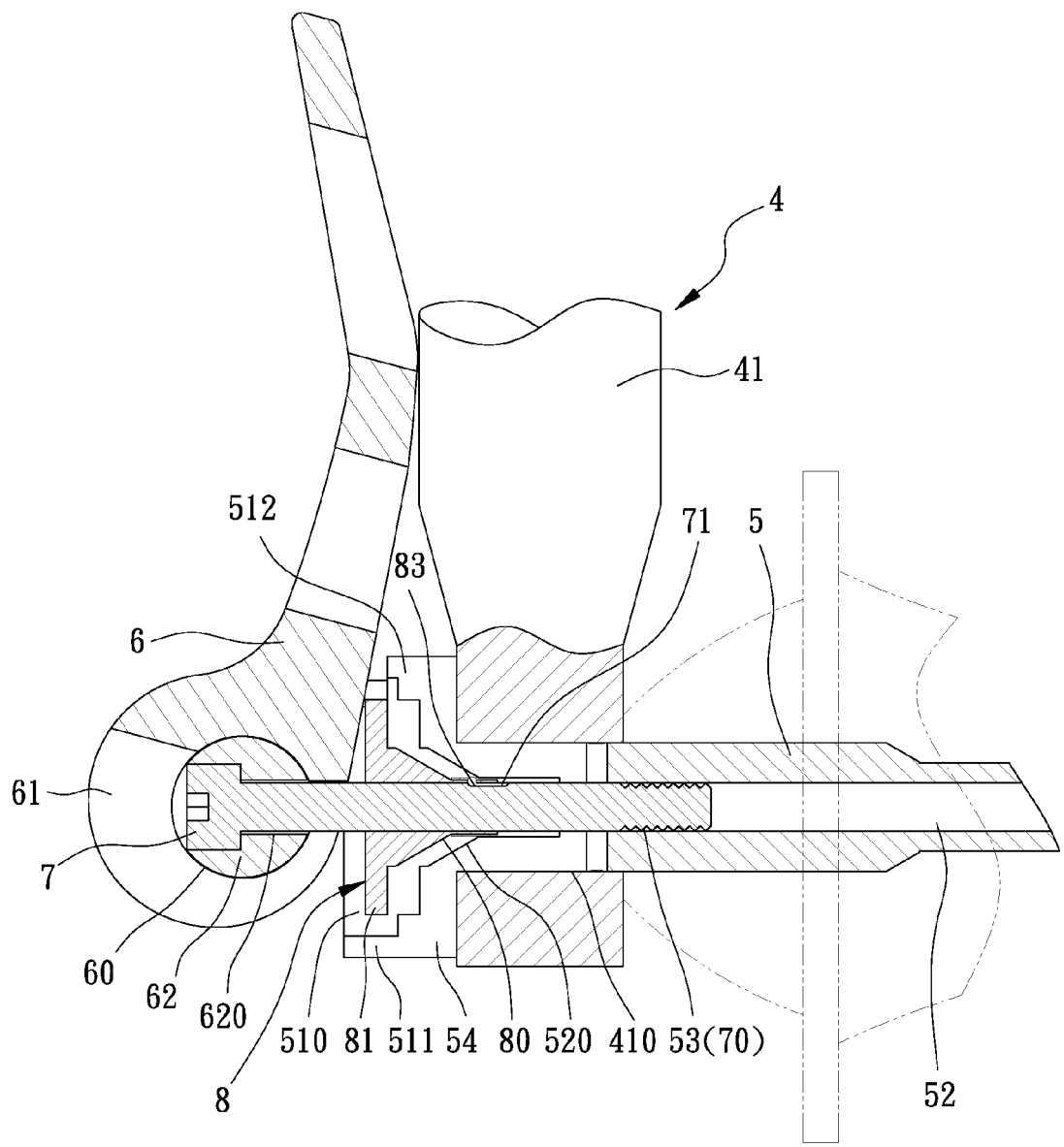
FIG. 6 is a cross-sectional view of the conventional quick-release device in accordance with the prior art when being released.

With reference to FIG. 4, after fastening the quick-release device in accordance with the present invention, the lever (3) is wrench and the pair of ears (30) is rotated relative to the pivot (26) to make the raised portions (301) forcedly abutting against the washer (25). As a result, the sleeve (21) and the ring (22) is inwardly moved to press the second tube (41) to shorten a distance between the first tube (40) and the second tube (41) to securely fasten an element, such as a hub, between the first tube (40) and the second tube (41). Consequently, the spring (23) is compressed between the second end of the tubular structure (1) and the flange (211) of the sleeve (21) to make the ring (22) being separated from the flange (11) of the tubular structure (1). As a result, the bosses (222) are disengaged from the indentations (110) such that the sleeve (21) and the ring (22) can be freely rotated relative to the tubular structure (1) when the lever (3) is wrenched to adjust the direction thereof and prevent the quick-release device in accordance with the present invention from an accidental operation.

Figure 3:
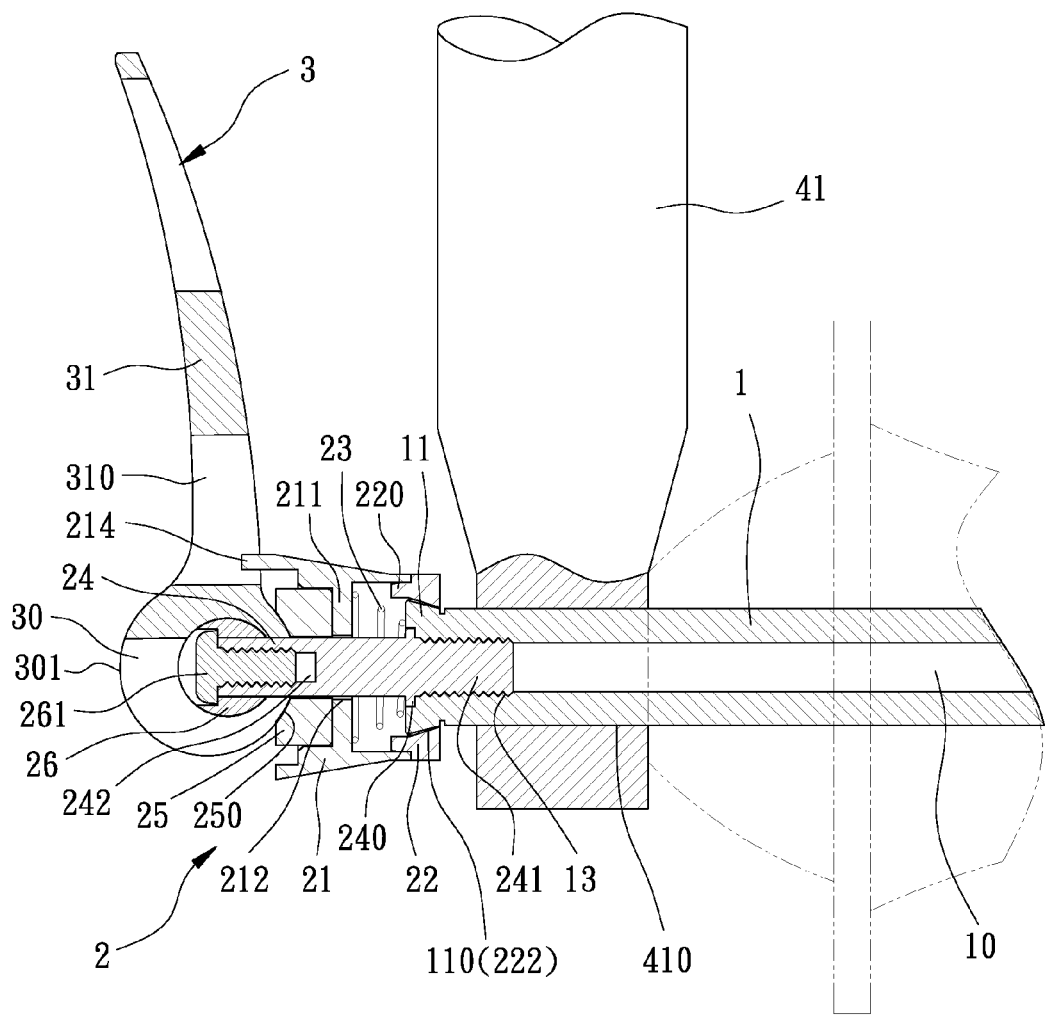
FIG. 3 is a cross-sectional view of the quick-release device in FIG. 1 when being released.

With reference to FIG. 3, after releasing the quick-release device in accordance with the present invention, the lever (3) is wrenched to make the protrusion (214) being received in the trough (310), and the sleeve (21) and the ring (22) are moved back to their original positions such that the ring (22) is engaged to the flange (11) of the tubular structure (1) due to the bosses (222) and the indentations (110). Consequently, the ring (22) can rotate the tubular structure (1) to make the outer threaded portion (14) being separated from the first tube (40) of the fork (4) and quickly detach the quick-release device in accordance with the present invention from the fork (4) when wrenching the lever (3) to rotated the sleeve (21) due to the connection between the trough (310) and the protrusion (214).

Although the invention has been explained in relation to its preferred embodiment, it is to be understood that many other possible modifications and variations can be made without departing from the spirit and scope of the invention as hereinafter claimed.

What is claimed is:

1. A quick-release device comprising:
   a tubular structure adapted to extend through a first tube of a fork and having a first threaded end adapted to be mounted to a second tube of the fork, a flange radially extending from a second end of the tubular structure, the flange including indentations on an outer periphery thereof;
   a ring sleeved on the tubular structure and selectively axially engageable to the flange, the ring including an axially extending skirt, the skirt comprising bosses on an inner periphery thereof configured to engage the indentations of the flange, the skirt further comprising stubs on an outer periphery thereof;
   a sleeve axially connected to the ring, the sleeve comprising a centrally defined through hole and a flange radially extending from an inner periphery of the through hole to define an inner hole, wherein the flange divides the through hole in the sleeve into a first section and a second section, wherein the first section comprises ditches on an inner periphery thereof configured to engage the stubs on the outer periphery of the skirt, the sleeve further comprising a protrusion extending axially from and edge of the second section of the sleeve opposite to the ring;
   a spring compressively disposed in the first section of the through hole in the sleeve, the spring having two opposite ends respectively abutting against the second end of the tubular structure and the flange of the sleeve;
   a shaft co-axially connected to the second end of the tubular structure, the shaft having a flange radially extending therefrom to divide the shaft into a first portion and a second portion, wherein the first portion is connected to the second end of the tubular structure and the second portion extends through the inner hole in the sleeve;
   a washer received in the second section of the through hole in the sleeve and abutting the flange of the sleeve, a through hole centrally defined in the washer to allow the second portion of the shaft to extend through the washer;
   a pivot mounted to a distal end of the second portion of the shaft; and
   a lever pivotally mounted onto the pivot, the lever including a handle having a pair of ears formed on one end of the handle and abutting the washer, each ear having a pivot hole defined therein for rotatably receiving two opposite ends of the pivot, and a cam-shaped raised portion formed on one side thereof, the handle further comprising a trough near the pair of ears;
   wherein when the handle is pivoted such that the raised portions of the ears face away from the washer, the protrusion is received in the trough and the bosses of the ring are engaged with the indentations on the flange of the tubular structure such that rotating the lever about the axis of the tubular structure rotates the sleeve, the ring, and the tubular structure, thereby threadingly engaging the first end of the tubular structure into the second tube of the fork; and
   wherein when the handle is pivoted such that the raised portions of the ears face towards the washer, the sleeve is pushed against the spring such that the ring abuts the first tube of the fork.

2. The quick-release device as claimed in claim 1, wherein the tubular structure includes an annular groove longitudinally defined in the second end thereof for receiving the flange of the shaft.

3. The quick-release device as claimed in claim 2, wherein the tubular structure includes a through hole centrally defined therein and an inner threaded portion formed on an inner periphery of the through hole in the tubular structure near the annular groove.

4. The quick-release device as claimed in claim 3, wherein the first portion of the shaft is threaded and screwed into the inner threaded portion of the tubular structure.

5. The quick-release device as claimed in claim 1, wherein the tubular structure includes an outer threaded portion that is adapted to be screwed into the second tube of the fork.

* * * * *